(12) United States Patent
Browne

(10) Patent No.: US 8,366,132 B2
(45) Date of Patent: Feb. 5, 2013

(54) MIDDLE HOOP SYSTEM FOR AN ARTICULATED VEHICLE

(75) Inventor: Denis Browne, Trittau (DE)

(73) Assignee: ATG Autotechnik GmbH, Siek (DE)

( * ) Notice: Subject to any disclaimer, the term of this patent is extended or adjusted under 35 U.S.C. 154(b) by 530 days.

(21) Appl. No.: 12/748,003

(22) Filed: Mar. 26, 2010

(65) Prior Publication Data

US 2010/0283223 A1 Nov. 11, 2010

(30) Foreign Application Priority Data

Mar. 26, 2009 (EP) .................................... 09004399

(51) Int. Cl.
*B60D 5/00* (2006.01)
*B61D 17/20* (2006.01)

(52) U.S. Cl. ........................ 280/403; 280/420; 105/8.1

(58) Field of Classification Search .................. 280/403, 280/420, 421, 422, 424; 105/8.1–25.1; 296/178
See application file for complete search history.

(56) References Cited

U.S. PATENT DOCUMENTS

| | | | | |
|---|---|---|---|---|
| 2,843,417 A | * | 7/1958 | Wahl et al. | 280/403 |
| 3,137,514 A | * | 6/1964 | Wahl | 280/403 |
| 4,247,128 A | * | 1/1981 | Knapp et al. | 280/403 |
| 6,076,470 A | * | 6/2000 | Koch | 105/8.1 |
| 2011/0272915 A1 | * | 11/2011 | Browne | 280/403 |

FOREIGN PATENT DOCUMENTS

| | | |
|---|---|---|
| DE | 19714543 | 8/1998 |
| DE | 10238110 | 3/2004 |
| EP | 0538816 | 4/1993 |
| EP | 0897337 | 2/1999 |
| WO | WO-91/02672 | 3/1991 |

OTHER PUBLICATIONS

EP Search Report dated Sep. 21, 2009, directed to EP Application No. 09004399.3; 4 pages.

* cited by examiner

*Primary Examiner* — Anne Marie Boehler
*Assistant Examiner* — Wesley Potter
(74) *Attorney, Agent, or Firm* — Morrison & Foerster LLP

(57) ABSTRACT

The invention relates to a middle hoop system for a vehicle joint. The vehicle joint is arranged between a vehicle front part and a vehicle rear part of an articulated vehicle, such as for example of an articulated bus, and forms a passage (24) between the vehicle front part and the vehicle rear part. The middle hoop system comprises a middle hoop (12) and a cable guide between the vehicle front part and the vehicle rear part. The middle hoop (12) surrounds the passage (24). The cable guide is arranged above the passage (24). According to the invention, for the cable guide, a leaf spring (14) is provided which extends from the vehicle front part to the vehicle rear part. By means of the leaf spring, cables (16) can be guided between the vehicle front part and the vehicle rear part over the entire length of the leaf spring (14). Undefined movements of the cables when the vehicle front part and the vehicle rear part move relative to one another are eliminated.

15 Claims, 4 Drawing Sheets

MIDDLE HOOP SYSTEM FOR AN ARTICULATED VEHICLE

REFERENCE TO RELATED APPLICATION

This application claims the priority of European Patent Application No. 09 004 399.3, filed Mar. 26, 2009, the contents of which are incorporated herein by reference.

FIELD OF THE INVENTION

The invention relates to a middle hoop system for a vehicle joint. The vehicle joint is arranged between a vehicle front part and a vehicle rear part of an articulated vehicle and forms a passage between the vehicle front part and the vehicle rear part. The middle hoop system comprises a middle hoop and a cable guide between the vehicle front part and the vehicle rear part. The middle hoop surrounds the passage. The cable guide is arranged above the passage.

BACKGROUND OF THE INVENTION

Middle hoop systems of said type are used for example in articulated buses, in which it is possible for passengers to pass between the vehicle front part and the vehicle rear part while the vehicle is travelling. To protect the passengers from environmental influences, a bellows is typically provided between the vehicle front part and the vehicle rear part, which bellows surrounds the vehicle joint.

In articulated vehicles of said type, there are technical functions which relate both to the vehicle front part and also to the vehicle rear part. For example, if the driver, who is seated in the vehicle front part, actuates the headlamp switch, this should also result in a tail lamp of the vehicle rear part being illuminated. To enable this, an electrical cable runs from the vehicle front part via the intermediate space and up to the vehicle rear part. Further functions require for example hydraulic lines, air hoses and other supply lines between the vehicle front part and the vehicle rear part.

In the meantime, so-called low-floor vehicles have become widely established, in which the floor intended for use by passengers is arranged as low as possible. If the transition between the vehicle front part and the vehicle rear part is to be formed without a step, only a small amount of space for the vehicle joint remains under the passage connecting the vehicle front part and the vehicle rear part. It is known from the prior art for cables guided between the vehicle front part and the vehicle rear part to be arranged not below but rather above the passage (EP 0 897 337). Above the passage, the cables are fastened to the end frame of the vehicle front part, to the end frame of the vehicle rear part and to the middle hoop. In between, the cables have no fixed guide, but are held merely by their inherent stability.

SUMMARY OF THE INVENTION

The object on which the invention is based is that of proposing a middle hoop system which enables more reliable guidance of the cables between the vehicle front part and the vehicle rear part. Taking the initially cited prior art as a starting point, the object is achieved by means of the features broadly disclosed herein. Accordingly, for a cable guide, a leaf spring is provided according to the invention which extends from the vehicle front part to the vehicle rear part. Several advantageous embodiments are described.

Some expressions will be explained first. Within the context of the present invention, cables serve to link technical functions of the vehicle front part and of the vehicle rear part to one another. The expression "cable" encompasses all supply lines via which signals or forces are transmitted between the vehicle front part and the vehicle rear part. The expression "cable" encompasses in particular electrical cables, glass fiber lines, hydraulic lines, air hoses for air-conditioning system and heating system.

A leaf spring is an elongate element which, transversely with respect to its longitudinal extent, can be elastically deformed easily in one direction and elastically deformed with more difficulty in the other direction. In the middle hoop system according to the invention, the leaf spring is arranged such that it can be deformed easily in the horizontal direction and with more difficulty in the vertical direction. The leaf spring may for example be produced from commercially available spring steel. Other materials, such as for example plastics, may however also be taken into consideration. In the relaxed state, the leaf spring may be straight but may also have an already pre-bent shape.

The leaf spring is suspended between the vehicle front part and the vehicle rear part in such a way that, by means of elastic deformation, it compensates all changes in spacing between the vehicle front part and the vehicle rear part occurring in the event of pivoting or pitching movements. The invention utilizes the fact that the elastic deformation of the leaf spring takes place predominantly in the horizontal plane and not in the vertical plane. The elastic deformation is transmitted from the leaf spring to the cables, such that said cables are guided by means of the leaf spring over the entire length between the vehicle front part and the vehicle rear part. By means of the invention, therefore, despite pitching movements or pivoting movements of the articulated vehicle, no undefined movements of the cable takes place. The risk of damage to the cables is reduced.

The vehicle front part is terminated by a rear end frame, and the vehicle rear part is terminated by a front end frame. The two end frames delimit the intermediate space between the vehicle front part and the vehicle rear part. A fastening is preferably provided between the leaf spring and end frames, wherein the fastening should be arranged in the vicinity of the point at which the cable passes through the end frame. The fastening may be rigid. For the compensation of pitching movements, however, it is advantageous for a pivoting movement of the leaf spring relative to the end frame to be possible. For this purpose, a pivot joint may be provided between the leaf spring and the end frame, which pivot joint has preferably a horizontal pivot axis.

It is possible for the leaf spring to be free from further fastening points between the two end frames and to be held merely by means of its inherent stability. However, there is then the risk of the leaf spring being set in vibration and performing undesired movements, for example impacting against the middle frame. Provision may therefore be made for the leaf spring to be suspended on the middle hoop. The leaf spring then has a double function, in that it firstly guides the cables between the vehicle front part and vehicle rear part and secondly dampens vibrations of the middle hoop. A particular advantage of the invention is realized by means of said double action.

The suspension of the leaf spring may be central, that is to say at the point of intersection of the vehicle central line and middle hoop. This is particularly expedient if the leaf spring extends from the left-hand vehicle half of the vehicle front part to the right-hand vehicle half of the vehicle rear part or vice versa.

In one advantageous embodiment, in the normal state, in the region of the suspension bracket, the leaf spring is aligned substantially parallel to the middle hoop, that is to say encloses an angle of less than 45°, preferably less than 30°, with the direction of the middle hoop. Where reference is made to a normal state of an articulated vehicle, this means a state in which the vehicle front part and the vehicle rear part are standing on a flat surface without the vehicle joint having been pivoted. The end frame of the vehicle front part is then often aligned parallel to the end frame of the vehicle rear part. In order that the leaf spring has sufficient clearance for the compensation of the pitching movements and pivoting movements, said leaf spring is preferably at least 1.3 times, more preferably at least 1.5 times as long as the spacing between the two end frames in the normal state.

The leaf spring may be suspended on the middle hoop by means of a joint. The joint permits a pivoting movement of the leaf spring relative to the middle hoop, with the pivot axis preferably being aligned vertically. In this way, vibrations of the leaf spring in the vertical direction are eliminated, while the leaf spring can move relatively freely in the horizontal direction. If the axis of the joint additionally corresponds to the rotational axis of the middle hoop, the middle hoop can be pivoted about the vertical axis without this having an influence on the position of the leaf spring.

In an alternative embodiment, a rigid connection may be provided between the leaf spring and the middle hoop. The leaf spring then contributes to a greater extent to the stabilization of the middle hoop. However, the leaf spring is subject to greater deformation in the region of the connection to the middle hoop.

Alternatively or in addition to the articulated connection, a sliding guide may also be provided between the leaf spring and the middle hoop. In this way, also, vibrations of the leaf spring in the vertical direction can be prevented while otherwise only extremely small forces can be transmitted between the leaf spring and the middle bar. A sliding guide may be particularly advantageous if the leaf spring is suspended on the middle hoop eccentrically.

To hold the cables in position relative to the leaf spring, guide elements may be provided on the leaf spring. The guide elements may be designed such that the cables lie above or below the leaf spring. The cables then follow exactly the path defined by the leaf spring. A smaller structural height in relation to this may be obtained if the guide elements are designed such that the cables lie to the side of the leaf spring. Then, however, longitudinal displacements between the leaf spring and the cables can occur in the event of a deformation of the leaf spring.

For additional stabilization of the middle hoop, one or more shock absorbers may be provided which are arranged above the passage and which extend between the middle hoop and the end frame of the vehicle front part or vehicle rear part. The damping action of the shock absorber may be based in particular on a spring cylinder, a gas pressure damper or a hydraulic damper. The shock absorbers should stabilize the middle hoop without at the same time exerting a torque. The shock absorbers are therefore preferably arranged in the central line of the articulated vehicle.

The invention also relates to a vehicle joint which is equipped with a middle hoop system according to the invention. The vehicle joint is designed to connect a vehicle front part to a vehicle rear part and, in so doing, to form a passage between the vehicle front part and the vehicle rear part. The invention also encompasses an articulated vehicle equipped with a joint of said type.

BRIEF DESCRIPTION OF THE DRAWINGS

The invention will be described by way of example below with reference to the appended drawings on the basis of an advantageous embodiment, in which.

DETAILED DESCRIPTION OF THE INVENTION

Figure 1:
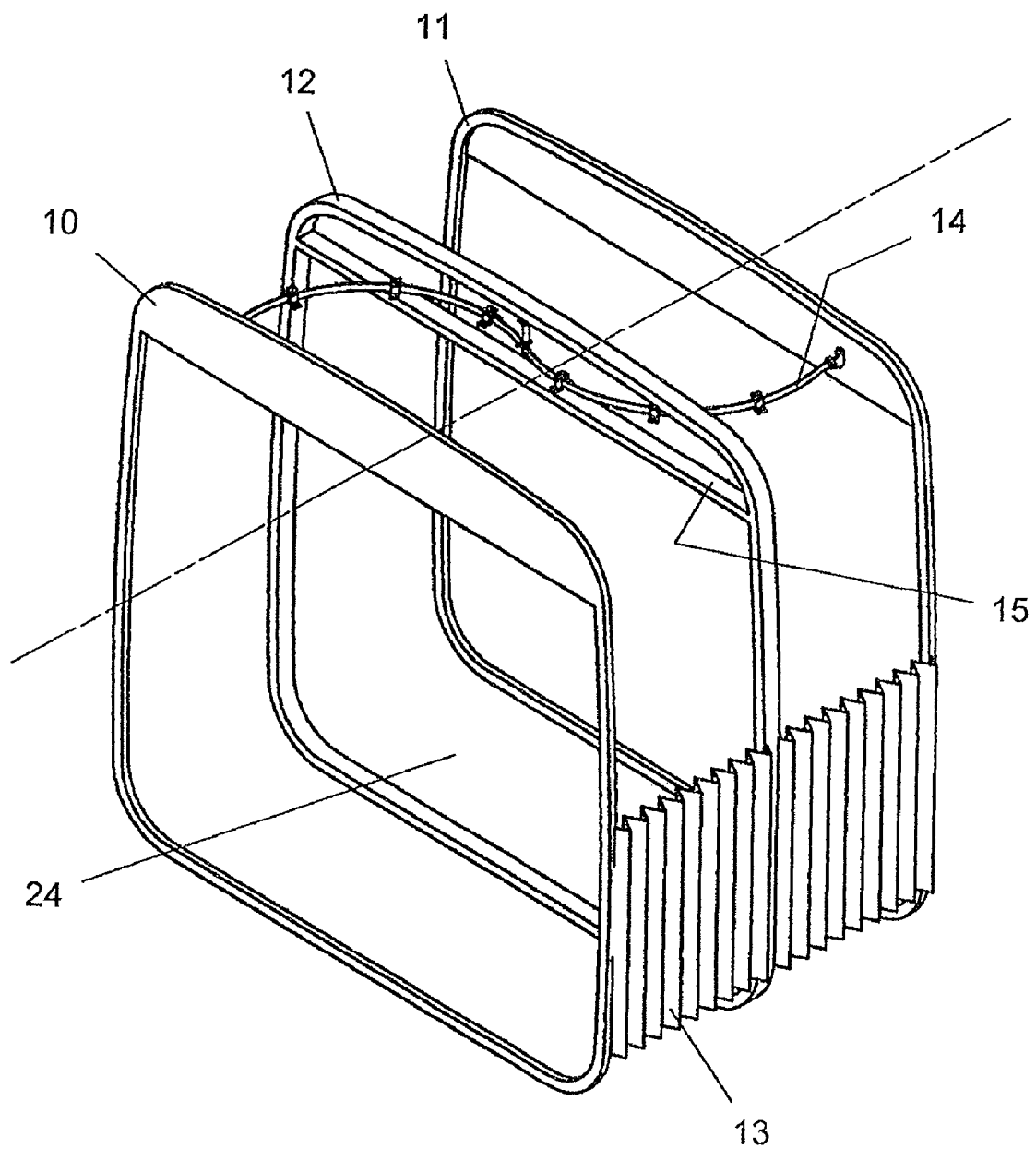
FIG. 1 shows a perspective view of a middle hoop system according to the invention.

In articulated vehicles, such as for example articulated buses, a vehicle front part and a vehicle rear part are connected to one another by means of a vehicle joint. The vehicle joint is designed so as to enable the passengers to pass between the vehicle front part and the vehicle rear part while the vehicle is travelling. FIG. 1 shows a rear end frame 10 of a vehicle front part and a front end frame 11 of a vehicle rear part. The vehicle front part and the vehicle rear part are connected to one another by means of a vehicle joint (not illustrated). Arranged on the vehicle joint is a middle hoop 12 whose contour corresponds to the contour of the end frames 10, 11. The end frames 10, 11 and the middle hoop 12 surround a passage 24; a person using the passage 24 between the vehicle front part and the vehicle rear part walks through the two end frames 10, 11 and the middle hoop 12.

The passage 24 is surrounded by a bellows 13 (indicated only in part in FIG. 1) which protects the passengers from environmental influences. The bellows 13 is composed of two halves, with the front half extending between the end frame 10 of the vehicle front part and the middle hoop 12 and with the rear half extending between the middle hoop 12 and the end frame 11 of the vehicle rear part. The middle hoop 12 serves to provide support for the bellows 13.

The middle hoop 12 comprises a cross bar 15 arranged above the passage 24. The passage 24 is hung, at the height of the cross bar, with a cover (not illustrated) such that a cavity is formed between the cover and the outer bellows 13. The cover forms the ceiling of the passage 24.

In FIG. 1, the articulated vehicle is in the normal state, that is to say is standing on a planar surface and the vehicle rear part is not pivoted relative to the vehicle front part. The end frames 10, 11 and the middle hoop 12 are arranged in mutually parallel planes. If the articulated vehicle performs pitching or pivoting movements, then the end frames 10, 11 and the middle hoop 12 move relative to one another. Since the end frames 10, 11 and the middle hoop 12 are held with a fixed spacing to one another in the lower region by the vehicle joint, the upper sections in particular of the end frames 10, 11 and of the middle hoop 12 are subject to considerable movements relative to one another.

Figure 2:
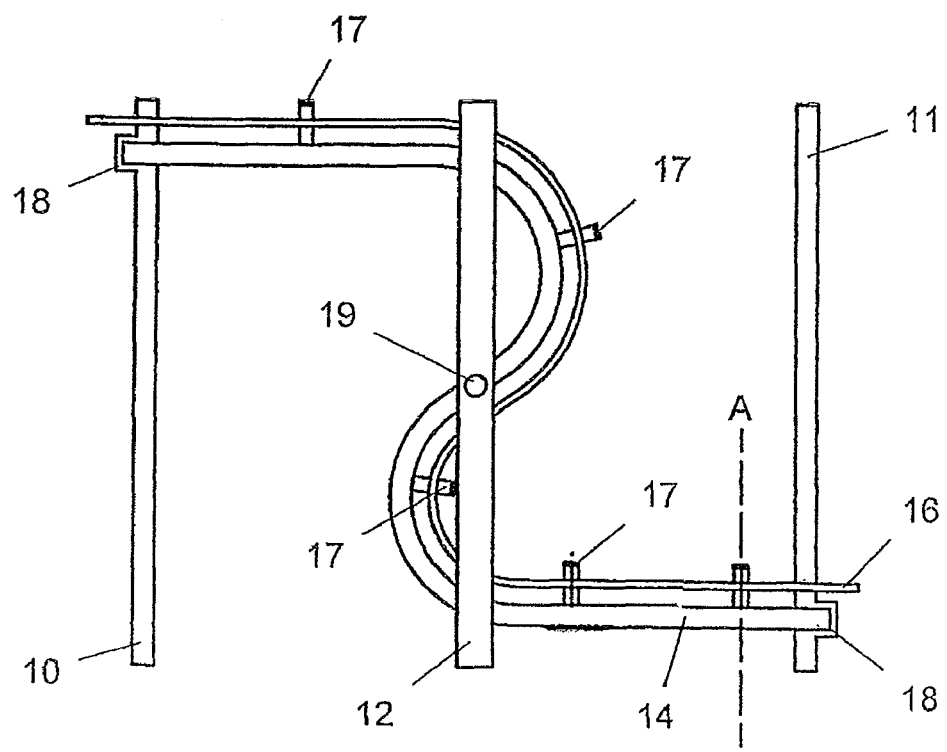
FIG. 2 shows a schematic view from above of a middle hoop system according to the invention.
Figure 3:
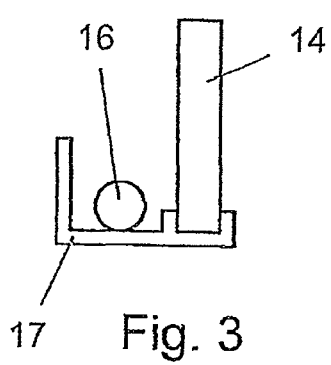
FIG. 3 shows a section along the line A-A from FIG. 2.
Figure 4:
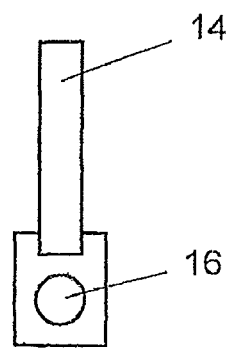
FIGS. 4, 5, 6 show the view from FIG. 3 in other embodiments of the invention.

For certain technical functions of the articulated vehicle, cables 16 extend between the vehicle front part and the vehicle rear part. FIGS. 2 to 4 illustrate a single cable 16 by way of example, but a multiplicity of cables 16 is often provided. The cables 16 may for example transmit electrical or optical signals or may be hydraulic lines, air hoses or other supply lines. To keep the spatial requirement below the passage 24 as small as possible, the cables 16 are arranged above the passage 24. The cables 16 open out in each case through the end frames 10, 11 into the intermediate space between the vehicle front part and the vehicle rear part. In the intermediate space, the cables are guided such that they are not damaged by pivoting movements and pitching movements of the articulated vehicle.

For the cable guidance in the intermediate space between the vehicle front part and the vehicle rear part, a leaf spring 14 is provided. The leaf spring 14 extends along a curved path between the vehicle front part and the vehicle rear part. In FIG. 1, the curved path is S-shaped. It begins in the left-hand vehicle half at the end frame 11 of the vehicle rear part, crosses the vehicle central line at the middle hoop 12 and ends in the right-hand vehicle half at the end frame 10 of the vehicle front part.

Figure 5:
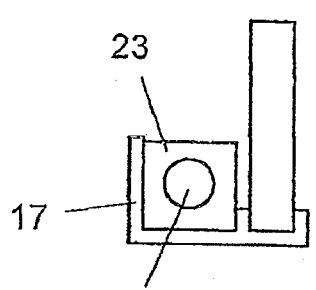

As shown in FIGS. 3 to 5, the leaf spring 14 has a rectangular cross section, with the longer side of the rectangle being aligned vertically and the short side of the rectangle being aligned horizontally. The leaf spring 14 can thereby be deformed easily in the horizontal direction while having a considerable degree of stability in the vertical direction. The leaf spring 14 can thereby compensate relative movements of the end frames 10, 11 relative to one another, with the deformation of the leaf springs taking place predominantly in the horizontal plane and at most to a small extent in the vertical direction.

Arranged on the leaf spring 14 is a multiplicity of guide elements 17, by means of which the cables 16 are held parallel to the leaf spring 14. In this way, the cables 16 are guided, in exactly the same way as the leaf spring 14, such that relative movements between the end frames 10, 11 are compensated without this being associated with a considerable movement in the vertical direction. The movement of the cables 16 is predefined, over the entire distance between the end frames 10, 11, by the leaf spring 14 such that undefined movements of the cables 16 are eliminated.

In the embodiment shown in FIG. 2, the leaf spring 14 is straight in the relaxed state. If the leaf spring has the S-shape shown in FIG. 2, then it is under stress, such that depressions 18 in the end frames 10, 11 are sufficient to hold the leaf spring in said state. Additional fastening means may be provided but are not strictly necessary.

Figure 9:
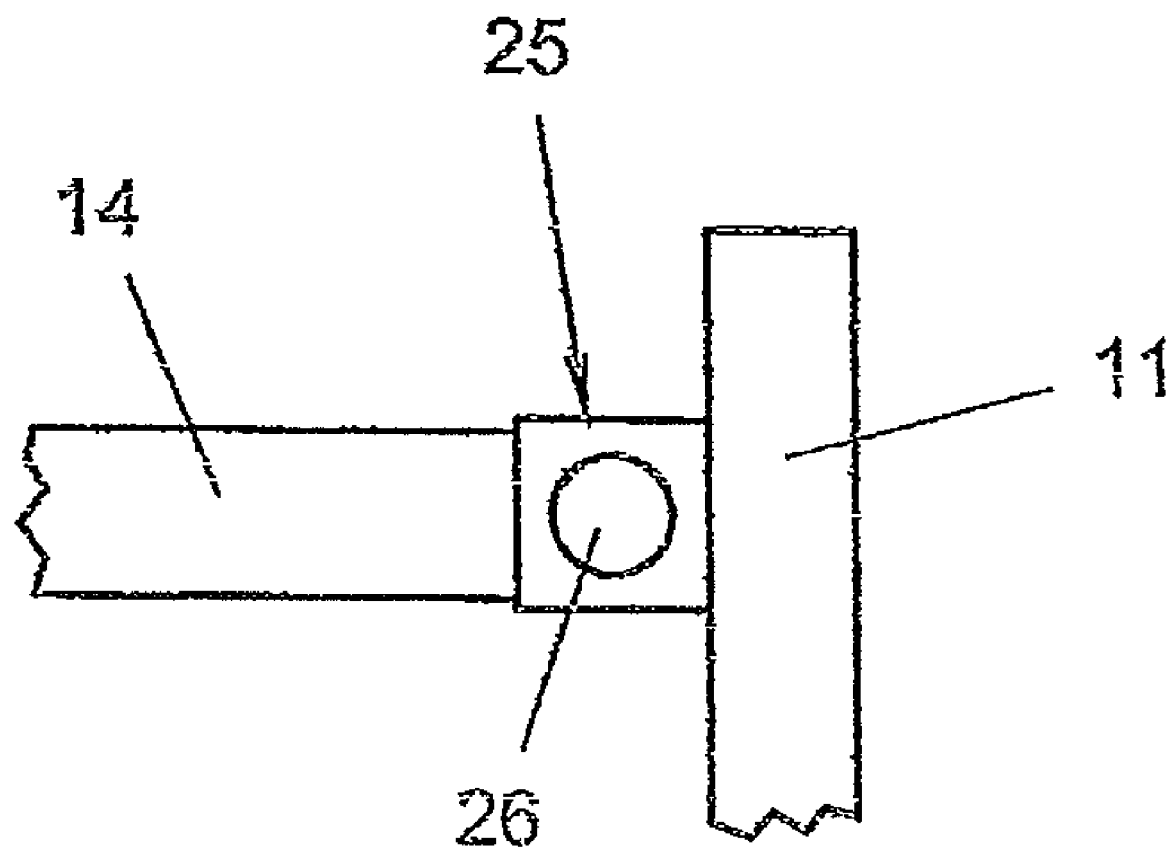
FIG. 9 shows a connection between the leaf spring and end frame.

In the alternative embodiment of FIG. 9, a pivot joint 25 with a horizontal pivot axis 26 is provided between the leaf spring 14 and the end frame 11 of the vehicle rear part. A corresponding pivot joint connects the leaf spring 14 to the end frame 10 of the vehicle front part. By means of the pivot joint 25, the leaf spring 14 can compensate pitching movements between the vehicle front part and the vehicle rear part.

In FIG. 2, the leaf spring 14 is connected to the middle hoop 12 by means of a joint 19. The joint 19 is arranged in the central line of the vehicle and forms a vertical pivot axis between the leaf spring 14 and the middle hoop 12.

Figure 7:
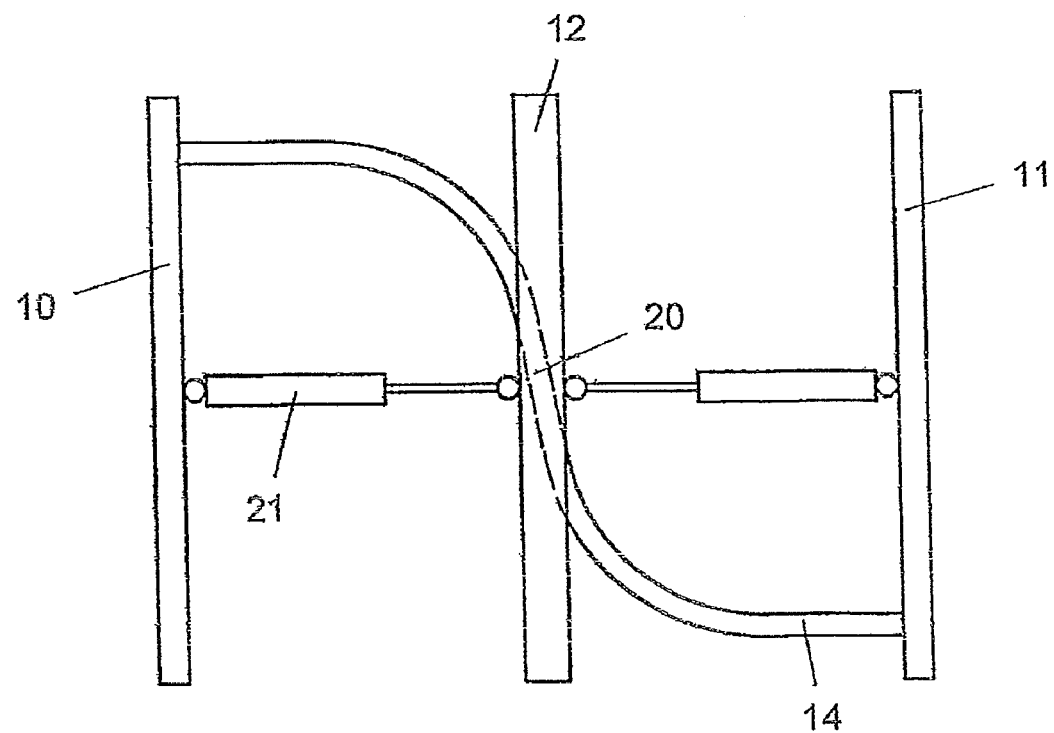
FIG. 7 shows a schematic view from above of a middle hoop system according to the invention.

In the alternative embodiment shown in FIG. 7, the leaf spring is rigidly connected, at 20, to the middle hoop 12. This has the advantage that the leaf spring 14 can simultaneously contribute to a greater extent to the stabilization of the middle hoop 12. On the other hand, it is necessary to accept greater deformations of the leaf spring when the end frames 10, 11 move relative to one another. To further stabilize the middle hoop 12, shock absorbers 21 are provided between the end frames 10, 11 and the middle hoop 12. The shock absorbers 21 extend in the central line of the articulated vehicle.

Figure 8:
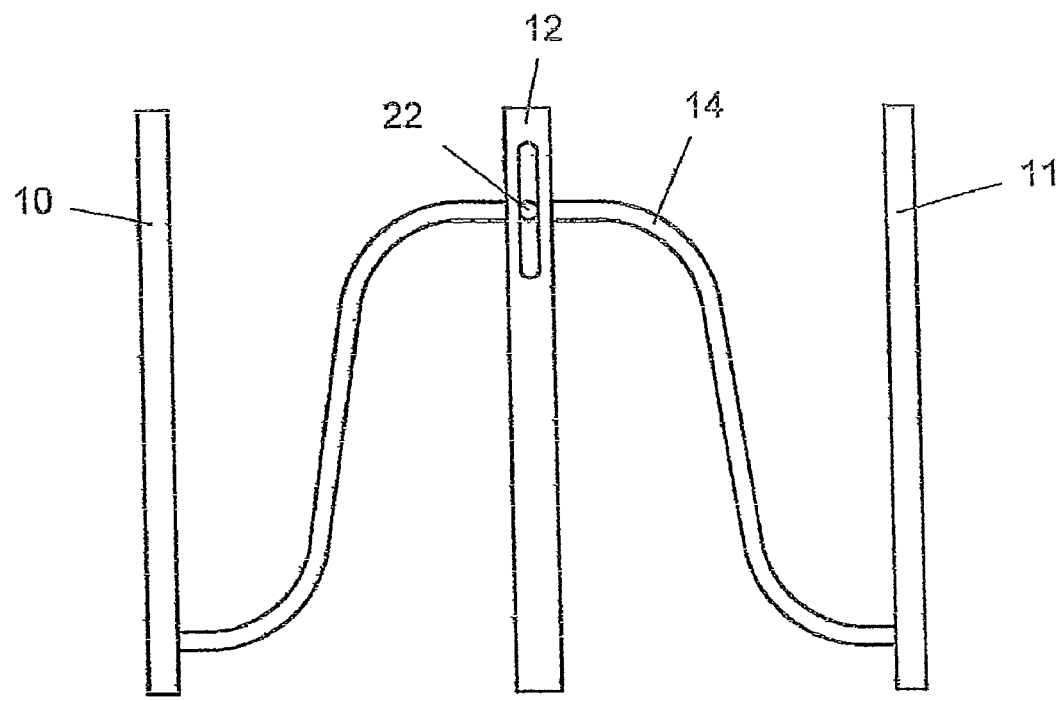
FIG. 8 shows the view from FIG. 7 in a further embodiment of the invention.

In FIG. 8, the leaf spring 14 has a double S-shape. It begins in the left-hand vehicle half at the end frame 11, extends over the right-hand vehicle half at the middle hoop 12, and back to the left-hand vehicle half at the end frame 10. Between the middle hoop 12 and the leaf spring 14, a sliding guide 22 is provided which is aligned transversely with respect to the direction of travel. The relative movements between the end frames 10, 11 are compensated by virtue of the leaf spring moving in the sliding guide 22 relative to the middle hoop 12. In said embodiment, only slight deformations of the leaf spring 14 are required in order to compensate relative movements of the end frames 10, 11.

Figure 6:
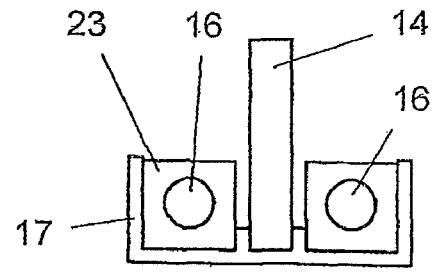

In the embodiment of FIGS. 2 and 3, the single cable 16 which is illustrated by way of example is guided to the side of the leaf spring 14. In said arrangement, deformations of the leaf spring 14 can lead to the cable 16 being displaced slightly relative to the leaf spring 14 in the longitudinal direction. To prevent longitudinal movements, the cable 16 may, as is shown in FIG. 4, be arranged in the same vertical plane as the leaf spring 14. The cable 16 then follows exactly the path of the leaf spring 14 over the entire length, such that no displacements occur. In the further embodiment of FIG. 5, a holder 23 is provided between the cable 16 and the guide element 17. The holder 23 may be fixedly connected to the guide element 17 or movable relative to the guide element 17. In particular if the holder 23 is fixedly connected to the guide element 17, it may be provided that the guide element 17 is movable relative to the leaf spring 14 in order to compensate longitudinal displacements. In FIG. 6, the cables 16 are guided to both sides of the leaf spring.

The invention claimed is:

1. A middle hoop system for a vehicle joint which is arranged between a vehicle front part and a vehicle rear part and which forms a passage between the vehicle front part and the vehicle rear part, comprising:
 a middle hoop surrounding the passage; and
 a cable guide arranged above the passage comprising a leaf spring extending from the vehicle front part to the vehicle rear part.

2. The middle hoop system of claim 1, further comprising a suspension connecting the leaf spring to the middle hoop.

3. The middle hoop system of claim 2, wherein the suspension forms a rigid connection between the leaf spring and the middle hoop.

4. The middle hoop system of claim 2, wherein the suspension forms an articulated connection between the leaf spring and the middle hoop.

5. The middle hoop system of claim 2, wherein the suspension forms a sliding guide between the leaf spring and the middle hoop.

6. The middle hoop system of claim 2, wherein the suspension is arranged centrally on the middle hoop.

7. The middle hoop system of claim 2, wherein, in the region of the suspension, the leaf spring extends substantially parallel to the middle hoop.

8. The middle hoop system of claim 1, further comprising a pivot joint provided between the leaf spring and at least one of an end frame of the vehicle front part and an end frame of the vehicle rear part.

9. The middle hoop system of claim 1, further comprising guide elements for cables are arranged on the leaf spring.

10. The middle hoop system of claim 9, wherein the guide elements are configured such that cables lie to the side of the leaf spring.

11. The middle hoop system of claim 1, wherein the leaf spring is at least 1.3 times as long as a spacing between an end frame of the vehicle front part and an end frame of the vehicle rear part in a normal state.

12. The middle hoop system of claim 1, further comprising a shock absorber provided between the middle hoop and an end frame of the vehicle front part or an end frame of the vehicle rear part.

13. The middle hoop system of claim 1, wherein the leaf spring is at least 1.5 times as long as a spacing between an end frame of the vehicle front part and an end frame of the vehicle rear part in a normal state.

14. A vehicle joint for connecting a vehicle front part to a vehicle rear part, the vehicle joint forming a passage between the vehicle front part and the vehicle rear part and comprising the middle hoop system of one of claims 1 to 12.

15. A vehicle, comprising:
 a vehicle front part;
 a vehicle rear part; and
 a vehicle joint configured to connect the vehicle front part to the vehicle rear part, the vehicle joint forming a passage between the vehicle front part and the vehicle rear part and comprising the middle hoop system of claim 1.

* * * * *